United States Patent [19]

Carlström et al.

[11] Patent Number: 4,534,936
[45] Date of Patent: Aug. 13, 1985

[54] METHOD FOR REMOVAL OF ORGANIC BINDING AGENTS FROM MOLDED BODIES

[76] Inventors: Elis Carlström; Agneta I. Johnsson; Leif A. G. Hermansson, all of Swedish Institute for Silicate Research, Box 5403, S-402 29 Gothenburg, Sweden

[21] Appl. No.: 508,455

[22] Filed: Jun. 9, 1983

[51] Int. Cl.³ .............................................. B22F 3/00
[52] U.S. Cl. ...................................... 419/36; 419/54; 419/55; 419/60; 419/65; 264/66
[58] Field of Search ................. 419/36, 54, 55, 60, 419/65; 264/66

[56] References Cited

U.S. PATENT DOCUMENTS

| | | | |
|---|---|---|---|
| 2,622,024 | 12/1952 | Gurnick et al. | 75/222 |
| 3,266,893 | 8/1966 | Duddy | 75/222 |
| 3,871,630 | 3/1975 | Wanetzky et al. | 75/225 |
| 4,011,291 | 3/1977 | Curry | 264/43 |
| 4,077,763 | 3/1978 | Jäger et al. | 432/14 |
| 4,305,756 | 12/1981 | Wiech | 75/211 |
| 4,404,166 | 9/1983 | Wiech | 419/36 |
| 4,440,547 | 4/1984 | Sarin et al. | 428/404 |

FOREIGN PATENT DOCUMENTS

| | | |
|---|---|---|
| 0032404 | 7/1981 | European Pat. Off. . |
| 3127066 | 1/1983 | Fed. Rep. of Germany . |
| 1516079 | 6/1978 | United Kingdom . |

*Primary Examiner*—Stephen J. Lechert, Jr.
*Attorney, Agent, or Firm*—Stevens, Davis, Miller & Mosher

[57] ABSTRACT

A method for removal of organic binders from powder compacts is disclosed in which the compact is heated while the weight change is monitored and controlled. The heating is regulated so that the removal rate of the binder is optimized. The removal time can be shortened without creating defects in the powder compact.

11 Claims, No Drawings

METHOD FOR REMOVAL OF ORGANIC BINDING AGENTS FROM MOLDED BODIES

BACKGROUND

When forming powder compacts, e.g. from metal and ceramic powders, temporary binding agents are frequently used. After forming of the body, the binding agents are removed by some kind of extraction process usually involving heating. This procedure is very critical and very time-consuming. Normally very careful linear heating is applied. The present invention relates to a fast self-adjustable and safe method for removal of organic binders from compacted bodies.

SUMMARY OF THE INVENTION

The purpose of the invention is to reduce the extraction time by controlling the heat rate in an optimized way. This is done by a heating procedure based on a continuous monitoring of the weight-loss during the process. The weight-loss information which is a direct result of decomposition reactions of the binders is used continuously to control the heating furnace via a microcomputer and thus to control the decomposition rate of the organic binders. In this way the decomposition rate is kept at a level that gives the fastest removal rate compatible with the avoidance of damage to the green compact (i.e. cracks, blisters and enlarged pores). In this way an optimized binder removal process is achieved. The system permits a self-adjustable regulation with full documentation of the extraction process history.

DETAILED DESCRIPTION OF THE INVENTION

By adding plastic binding agents to ceramic powders or metallic powders these mixtures can be shaped by injection-molding or other molding procedures. Injection-molding is a very attractive molding technique due to its high production capacity, near net shape capability and short forming time. A major drawback of the injection-molding procedure is the binder removal step which is necessary before the final sintering. This process is very time-consuming since normally a very slow linear heating of the bodies must be used. Removal time of several days and weeks are mentioned in the literature. The temporary binding agents—often organic polymers—are removed by heating in an inert gas (i.e $N_2$), in a reactive gas (i.e air) or in vacuum. During heating the binding agents are broken down through either heterogeneous or autogeneous reactions or a combination of both. The heterogeneous reaction may be an oxidation and the autogeneous reaction a breakdown of the organic molecules through radical formation. The results in both cases are a transformation of the organic binders to move volatile products which after evaporation can diffuse away from the body.

Normally, for convenience linear heating is used. However, decomposition of the binding agents occurs within narrow temperature intervals and so if heating is too rapid fast material transport will cause crack formation and other defects. To avoid this, extremely slow heating must be used throughout the heating. This is one of the approaches mentioned in the literature. The other approach is to use a wide range of compositions of the plastic constituents in order to broaden the burn-out temperature range.

In the present invention the weight-changes during heating are monitored and the information is used to adjust the heating rate to give a satisfactory rate of decomposition of the organic binders. In this way a significant reduction of the extraction time is achieved still producing uneffected green bodies.

In its simplest form the extraction according to this invention occurs by linear heating to a point where a preset, critical weight-loss value is exceeded. At this point the temperature is kept constant until the weight-loss rate has decreased below its critical value. Then the original linear heating is reapplied until the critical value is again reached and so on.

Since commonly-used organic binding agents often exhibit an exponentially increasing decomposition rate even at constant temperature or in vacuum it is sometimes necessary to modify the above program. In the modified program, the temperature rise is not just interrupted but is decreased when an increase of the decomposition rate begins. By careful selection of the temperature decrease when the critical weight-loss rate is exceeded the weight-loss rate can be kept almost constant throughout the whole binder-removal process. This more advanced modification ensues a minimization of the binder removal time while ensuring flawless green compacts.

Since the invention to a great extent permits a self-adjustable removal procedure, a minimized testing is required to set new process parameters when changing geometry and binder composition.

From the following examples the potential of this invention will be readily apparent

EXAMPLE 1

A testbar $10 \times 3 \times 55$ mm was injection-molded from a mixture of 84 w% SiC and 16 w% low-density polyethylene. The binder was removed by heat-treatment in vacuum. To avoid formation of large pores and cracks the following temperature program was used (a) Fast heating rate to 350° C. (17.5° C./h). During this heat-treatment almost no decomposition occurs.

(b) Slow heating to 450° C. (4°/h).

The total time for the temperature program was 45 h.

EXAMPLE 2

A construction for exploitation of the invention was made as follows:

A vacuum chamber containing an electric balance on which the body is placed was set up. The compact is heated by electric heating elements. A centrifugal pump maintains the vacuum in the chamber. The weight of the body and the temperature are monitored electronically. The values are transferred to digital form and stored in a computer. The time is registered by the internal clock of the computer. The computer is also used to control the power input of the heating elements in accordance with predetermined control programs.

EXAMPLE 3

The construction in Example 2 was programmed to heat the compact at a heating rate of 100° C./h to 350° C. and thereafter at 20° C./h to 500° C. Meanwhile the weight and therefore the weight-loss was registered at a fixed time interval thus giving the weight-loss rate. When the weight-loss rate exceeded 0.02 g/min (the total weight of the specimen was 12 g) the program decreased the temperature at 120° /h. When the weightloss rate again decreased to below the above mentioned value the temperature was increased again at 20° C./h. This procedure resulted in complete binder removal from a testbar, with dimensions and composition as in example 1, in 16 hours without any defects; a significant reduction of the binder removal time was thus achieved.

EXAMPLE 4

An injection-molded cylinder, 20 mm thick and with a diameter of 42 mm with 13 w% of a proprietory binder was treated in the equipment in example 2 and according to the program in example 3. The time required for complete binder removal for this sample was 34 h.

We claim:

1. A method of optimizing the removal of a temporary binder from a formed powder compact comprising heating of the powder compact in an inert or reactive gas or vacuum, monitoring the weight loss of the compact, and regulating the heating proportional to the difference between a preset weight-loss rate value and the actual process weight-loss rate value, the preset weight-loss rate value being below the rate above which cracks, blisters or other defects appear in the powder compact.

2. The method of claim 1, including removing the binder from a compact at the same time as the heating process is monitored and using the obtained heating characteristics for repeated binder removal processes.

3. The method of claim 1, wherein the compact is cooled when the weight loss rate of the compact exceeds the preset weight-loss rate value.

4. The method of claim 1, wherein the weight-loss rate is maintained substantially constant through the process.

5. A method to reduce the removal time of temporary binders from a formed powder compact comprising heating of the body in an inert or reactive gas or vacuum and regulating the heating rate during the process to a value calculated from an algorithm with the instantaneous value of time and weight as input data for the calculation, said algorithm being designed to decrease the heating rate when the weight-loss rate increases and to increase the heating rate when it decreases.

6. The method as claimed in claim 5 wherein said algorithm gives a fixed heating rate only as long as a critical weight-loss rate is not exceeded, said temperature being kept constant until the weight-loss rate falls below the predetermined limit when said weight-loss rate is exceeded.

7. The method as claimed in claim 5 wherein said algorithm gives a fixed heating rate only until a predetermined weight-loss rate is exceeded whereafter the temperature is decreased until a desired weight-loss rate is achieved.

8. The method as claimed in claim 5 wherein said algorithm gives a fixed heating rate only until a critical weight-loss rate is exceeded whereafter the temperature is regulated to keep the weight-loss rate at a desired level.

9. The method as claimed in claim 5 wherein said algorithm gives a high heating rate at low temperatures, said low temperatures being temperatures where the binders do not react, said high heating-rate being heating rates higher than the permitted heating rate.

10. The method as claimed in claim 5 including setting a critical weight-loss rate proportional to the surface/volume ratio of the compact, said critical weight-loss rate being obtained by multiplication of the surface/volume ratio by a constant of proportionality dependent on the binder system.

11. The method as claimed in claim 5 including removing the binders from a compact at the same time as the heating process is monitored and using the obtained heating characteristics for repeated binder removal processes.

* * * * *